H. H. STUSSY.
MILK PURIFYING AND HOMOGENIZING MACHINE.
APPLICATION FILED MAR. 11, 1910.

988,149.

Patented Mar. 28, 1911.

WITNESSES:

INVENTOR
Henry H. Stussy
BY
ATTORNEYS

UNITED STATES PATENT OFFICE.

HENRY H. STÜSSY, OF SIOUX CITY, IOWA.

MILK PURIFYING AND HOMOGENIZING MACHINE.

988,149.     Specification of Letters Patent.    Patented Mar. 28, 1911.

Application filed March 11, 1910    Serial No. 548,536.

*To all whom it may concern:*

Be it known that I, HENRY H. STÜSSY, a citizen of the United States, and a resident of Sioux City, Leeds Station, in the county of Woodbury and State of Iowa, have invented a new and Improved Milk Purifying and Homogenizing Machine, of which the following is a full, clear, and exact description.

10. This invention relates to milk purifying and homogenizing machines, and has reference more particularly to a machine of this class in which milk is passed centrifugally from a receptacle, through a plurality of openings, into an irregularly-shaped conduit, which assists in the homogenizing of the milk, the conduit having a plurality of escape outlets.

The object of the invention is to provide a simple and efficient machine of the class described, by means of which milk can be rendered stable, and insensitive to souring causes, by means of which impurities can be removed from the milk, and in which the globules of butter-fat are broken up and thoroughly disseminated throughout the milk.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1:
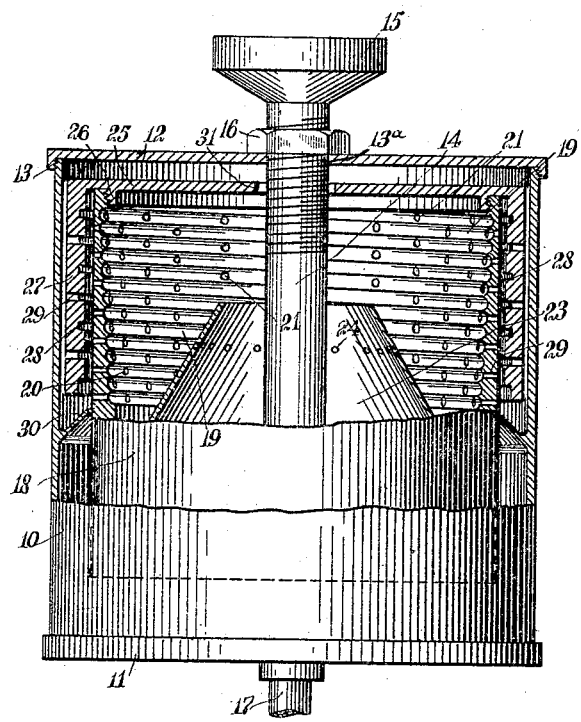
Figure 2:
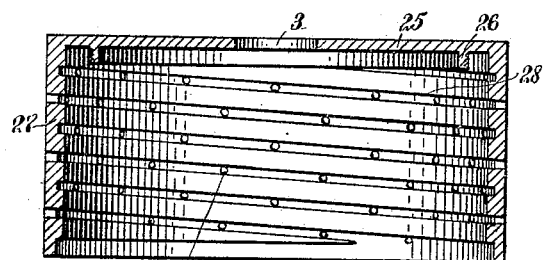
Figure 3:
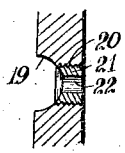

Figure 1 is a partial longitudinal section showing certain of the elements of an embodiment of my invention; Fig. 2 is a longitudinal section of a part of the device; and Fig. 3 is an enlarged, fragmentary section showing a detail.

Before proceeding to a more detailed explanation of my invention, it should be clearly understood that the present form of the device constitutes an improvement upon the milk purifying and homogenizing machine shown in my United States Patent No. 900,446, dated October 6, 1908. The improvement resides mainly in providing the irregularly-shaped conduit with a plurality of escape outlets, and also in forming the receptacle with a number of openings through which the milk can escape centrifugally into the irregularly-shaped conduit. These openings are arranged at different heights in the receptacle, and permit the milk to escape at different levels, thereby facilitating and increasing the rapidity of operation of the machine. The homogenizing action is effected by the hurling of the milk spray against the irregular wall of the conduit, whereby the butter-globules are broken up and comminuted.

While I have shown in the accompanying drawings a form of the machine in which the members forming the irregularly-shaped conduit are rigidly connected, and are therefore arranged to rotate together, this departure from the earlier form of my invention is optional, and if so desired, one of the members may be fixed, *i. e.*, that forming the receptacle can rotate as is disclosed in the patent above referred to. The plurality of openings would however, be employed in the latter case to permit the milk to pass from the receptacle into the irregularly-shaped conduit, and to escape from the latter, these openings constituting escape nozzles.

Referring more particularly to the drawings, I employ a casing 10, having a bottom 11, which may form part of the frame of the machine (not shown). The casing has a top 12 provided with a threaded flange engaging at the corresponding threaded rim of the casing. The bottom 11 may have a similar, upwardly disposed flange, which receives the lower rim of the casing. The top has a substantially central opening 13ª through which extends a tubular member 14, having at the top a funnel-shaped extension 15. The tubular member 14 serves for the introduction of the milk into the machine. It is threaded and has a threaded collar 16 by means of which it can be held in position at the top, and which permits of its adjustment. A shaft 17 extends through the bottom of the casing, and carries a cylindrical, fluid receptacle 18, located within the casing, and preferably concentric therewith. The receptacle is outwardly tapered at the inside, and provided with rounded, spiral grooves 19, which have associated therewith, threaded openings 20 through the wall of the receptacle. Plugs 21 correspondingly threaded, are fitted into the openings 20, and have passages 22 therethrough. The plugs have the inner faces rounded to correspond to the curvature of the grooves, as is shown most clearly in Fig. 3, and with the groove form escape nozzles which in effect are tapered. Their passages constitute outlet openings for the receptacle, as will appear hereinafter.

A tapered cap 23, having a suitable central opening surrounding the tube 14, is located within the receptacle, and has a plurality of symmetrically arranged outlet openings 24 about its central opening. Each corresponds to the similar element employed in the earlier form of my invention, as is disclosed in the patent referred to above. The receptacle is internally threaded at the upper rim, and has mounted thereon a cover 25 provided with a threaded, downwardly extending flange 26, fitting within the threaded rim of the receptacle. It has a central opening 31, which permits the tube 14 to project into the receptacle. The cover has associated therewith a cylindrical member 27, extending downwardly from the rim of the cover, and encompassing the receptacle. It is spaced from the latter, and has at the inner side, a spiral groove 28. It forms with the receptacle, the irregularly-shaped conduit into which the milk passes after it escapes from the receptacle, and which assists in homogenizing the fluid. The member 27 has a plurality of escape openings 29 therethrough, which have their inner terminals located in the spiral groove 28.

The casing, underneath the cylindrical member 27, has an annular, upwardly disposed shelf 30, which receives the milk from the irregularly-shaped conduit, and from the spaces between the members 27 and 18, and directs it to a suitable outlet (not shown).

When the receptacle 18 is rotated at a high rate of speed, by means of the shaft 17, which is actuated by suitable mechanism (not shown), the milk passes upwardly, through the nozzle cap 23, and escapes through the openings 22 of the receptacle to the irregularly-shaped conduit at high velocity. The milk will be distributed along the inner face of the receptacle, and will escape through the substantially tapered nozzle-opening, at high velocity, and will be hurled against the inner wall of the cylindrical member 27, whereby the butter-fat globules will be comminuted, and the milk will be thoroughly homogenized. It will escape from the conduit, that is from the space between the receptacle and the member 27, mainly through the openings 29, and will pass downward to the shelf 30. The openings 22 of the receptacle are positioned intermediate the adjacent grooves 28, so that the milk spray is hurled against the irregular, homogenizing surface before it can escape through the grooves 28 and the openings 29.

I employ certain devices in connection with the machine, for removing impurities, which devices are illustrated in my Patent No. 900,446.

Having thus described my invention, I claim as new, and desire to secure by Letters Patent:

1. In a machine of the class described, a receptacle for homogenizing milk, means for operating said receptacle, to eject the milk therefrom at a high velocity, whereby the milk escapes from said receptacle in the form of a spray, and an irregularly-shaped member arranged to receive the spray against it, whereby the butter-fat globules are comminuted, said members having a plurality of openings therethrough, constituting escape outlets for the milk.

2. In a machine of the class described, a receptacle for milk, means for ejecting the milk from said receptacle, and irregularly-shaped and spaced members, arranged to receive therebetween the milk escaping from said receptacle, and provided with a plurality of openings, whereby the milk can pass through one of said members against the other, and thence through said other.

3. In a machine of the class described, a rotatable receptacle having a plurality of openings through the wall thereof, a member encompassing said receptacle and forming therewith an irregularly-shaped conduit adapted to receive thereagainst fluid escaping from said receptacle through said openings, and means for rotating said receptacle.

4. In a machine of the class described, a rotatable receptacle having a plurality of openings through the wall thereof, a member encompassing said receptacle and forming therewith an irregularly-shaped conduit and adapted to receive against it fluid escaping from said receptacle through said openings, said member having a plurality of openings therethrough, and means for rotating said receptacle.

5. In a machine of the class described, irregularly-shaped members forming a conduit therebetween, and having openings therethrough communicating with said conduit, and means for causing milk to flow through said openings of one of said members, into the space between said members, and against the other of said members.

6. In a machine of the class described, a rotatable milk receptacle having a plurality of tapered escape openings, means for operating the same whereby milk therein is expelled centrifugally through said openings, a homogenizing conduit arranged concentrically with respect to said receptacle and having a plurality of outlets, and means for receiving milk from said conduit.

7. In a machine of the class described, a member constituting a milk receptacle, a member encompassing said first member and forming therewith a conduit, one of said members, at the side adjacent to said other member, being provided with irregularities, said members having pluralities of openings therethrough, and means for operating said receptacle member to eject milk therein, through the openings thereof, and against said encompassing member.

8. In a machine of the class described, a rotatable receptacle having a plurality of openings through the wall thereof, a member encompassing said receptacle and spaced from said receptacle, and means for rotating said receptacle, said member presenting a homogenizing surface.

9. In a machine of the class described, a rotatable, cylindrical receptacle having grooves formed at the inside thereof, and having openings through the wall thereof, communicating with said grooves, a cylindrical member encompassing said receptacle, said member at the inner side, being provided with grooves, and having openings through the wall thereof, communicating with said grooves, said openings of said receptacle being positioned between adjacent grooves of said member.

10. In a machine of the class described, a rotatable, cylindrical receptacle having a spiral groove at the inside thereof, and openings through the wall thereof, communicating with said spiral groove, a cover upon said receptacle, and having a downwardly-extending cylindrical member encompassing said receptacle and spaced therefrom, said cylindrical member having a spiral groove at the inside thereof and provided with openings through the wall thereof, communicating with said spiral groove, a casing encompassing said receptacle and said member and having a shelf adapted to receive fluid escaping through said openings of said receptacle and said cylindrical member, and means for rotating said receptacle.

In testimony whereof I have signed my name to this specification in the presence of two subscribing witnesses.

HENRY H. STÜSSY.

Witnesses:
LAURA L. ARMITAGE,
ROY W. SNELL.